US010375680B2

(12) United States Patent
Han et al.

(10) Patent No.: US 10,375,680 B2
(45) Date of Patent: Aug. 6, 2019

(54) UPLINK CHANNEL TRANSMISSION IN DUAL CONNECTIVITY

(71) Applicant: INTEL CORPORATION, Santa Clara, CA (US)

(72) Inventors: Seunghee Han, San Jose, CA (US); Youn Hyoung Heo, Seoul (KP); Yujian Zhang, Beijing (CN); Hong He, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 275 days.

(21) Appl. No.: 15/254,932

(22) PCT Filed: Mar. 16, 2015

(86) PCT No.: PCT/US2015/020735
§ 371 (c)(1),
(2) Date: Sep. 1, 2016

(87) PCT Pub. No.: WO2015/139032
PCT Pub. Date: Sep. 17, 2015

(65) Prior Publication Data
US 2017/0223694 A1    Aug. 3, 2017

Related U.S. Application Data

(60) Provisional application No. 61/953,637, filed on Mar. 14, 2014.

(51) Int. Cl.
*H04W 72/04* (2009.01)
*H04W 72/12* (2009.01)
(Continued)

(52) U.S. Cl.
CPC ....... *H04W 72/0413* (2013.01); *H04W 16/32* (2013.01); *H04W 52/146* (2013.01);
(Continued)

(58) Field of Classification Search
CPC ......... H04W 72/0413; H04W 72/1242; H04W 72/1284; H04W 16/32; H04W 52/146;
(Continued)

(56) References Cited

U.S. PATENT DOCUMENTS

| 8,462,688 | B1 | 6/2013 | Dinan |
| 2011/0038271 | A1 | 2/2011 | Shin et al. |

(Continued)

FOREIGN PATENT DOCUMENTS

| JP | 2014/522212 A | 8/2014 |
| RU | 2496268 C2 | 10/2013 |

(Continued)

OTHER PUBLICATIONS

3GPP TSG RAN WG1 Meeting #76, "Power Allocation strategy for power limited UEs in dual-connectivity", Fujitsu, R1-140193, Feb. 10-14, 2014. (Year: 2014).*

(Continued)

*Primary Examiner* — Chi Tang P Cheng
(74) *Attorney, Agent, or Firm* — Thorpe North & Western (57) ABSTRACT

Technology for dual connectivity is disclosed. A user equipment (UE) can identify a first physical channel that includes a first uplink control information (UCI) and a second physical channel that includes a second UCI. The UE can select a priority level for the first physical channel and a priority level for the second physical channel. The UE can apply power scaling to a first physical channel transmission or a second physical channel transmission if a total transmit power of the UE would exceed a specific value during a period of time. The UE can scale a transmit power for the second physical channel if the priority level for the first physical channel is higher than the priority level for the second physical channel depending on a type of first UCI and a type of second UCI.

8 Claims, 9 Drawing Sheets

(51) Int. Cl.
*H04W 52/14* (2009.01)
*H04W 52/28* (2009.01)
*H04W 52/36* (2009.01)
*H04W 16/32* (2009.01)
*H04W 52/34* (2009.01)
*H04L 1/18* (2006.01)
*H04L 5/00* (2006.01)
*H04W 52/32* (2009.01)

(52) U.S. Cl.
CPC ....... *H04W 52/281* (2013.01); *H04W 52/346* (2013.01); *H04W 52/367* (2013.01); *H04W 72/1242* (2013.01); *H04W 72/1284* (2013.01); *H04L 1/1887* (2013.01); *H04L 5/0055* (2013.01); *H04W 52/325* (2013.01)

(58) Field of Classification Search
CPC ............. H04W 52/281; H04W 52/346; H04W 52/367; H04W 52/325; H04L 1/1887; H04L 5/0055
USPC ......................................................... 370/329
See application file for complete search history.

(56) References Cited

U.S. PATENT DOCUMENTS

| | | | |
|---|---|---|---|
| 2013/0058315 A1 | 3/2013 | Feuersänger et al. | |
| 2013/0148614 A1 | 6/2013 | Noh et al. | |
| 2013/0176953 A1 | 7/2013 | Stern-Berkowitz et al. | |
| 2013/0188580 A1 | 7/2013 | Dinan | |
| 2013/0195048 A1* | 8/2013 | Ekpenyong | H04W 52/325 370/329 |
| 2015/0036566 A1* | 2/2015 | Blankenship | H04W 52/281 370/311 |

FOREIGN PATENT DOCUMENTS

WO WO 2013/025562 A2 2/2013
WO WO 2015017205 A1 2/2015

OTHER PUBLICATIONS

Samsung; "Prioritization of UL Information Types for Dual Connectivity"; 3GPP TSG R1-140376; (Feb. 10-14, 2014); 5 pages; RAN WG1 #76, Prague, Czech Republic; Agenda: 7.2.5.
Fujitsu; "Power allocation strategy for power limited UEs in dual-connectivity"; 3GPP TSG R1-140193; (Feb. 10-14, 2014); 8 pages; RAN WG1 Meeting #76, Prague, Czech Republic; Agenda: 7.2.5.
Extended European search report dated Aug. 23, 2017; for EP Application No. 15762283.8; filed Mar. 16, 2015; 10 pages.
3GPP TSG-RAN WG2 Mtg #84; R2-134048; Management of US Transmit Power in Dual Connectivity; Agenda Item 7.2.4; San Francisco USA Nov. 11-15, 2013.
3GPP TSG RAN WG2 Mtg. #84; R2-133945; Uplink transmission power management and PHR for dual connectivity; Agenda Item 7.2.4; San Francisco USA Nov. 11-15, 2013.
3GPP TSG-RAN WG2 #84; Tdoc R2-134234; Considerations on power control for Dual Connectivity; Agenda Item 7.2.4; San Francisco USA Nov. 11-15, 2013.
3GPP TS 36.213 V11.5.0 (Dec. 2013); Evolved Universal Terrestrial Radio Access (E-UTRA); Physical layer procedures (Release 11).
3GPP TR 36.872 V12.1.0 (Dec. 2013); Small cell enhancements for E-UTRA and E-UTRAN—Physical layer aspects (Release 12).
3GPP TR 36.842 V12.0.0 (Dec. 2013) Study on Small Cell enhancements for E-UTRA and E-UTRAN; Higher layer aspects (Release 12).

* cited by examiner

Parallel transmission of the PUCCHs from the UE with equal power scaling:

FIG. 2A

Only the PUCCH transmission with a lower priority is scaled down

FIG. 2B

PUCCH transmission with lower priority is dropped:

Parallel transmission of the PUCCH and the PRACH from the UE with equal power scaling:

FIG. 4A

The PUCCH transmission has a lower priority and is scaled down while the PRACH transmission is not scaled down

FIG. 4B

The PUCCH transmission has a lower priority and is dropped:

UPLINK CHANNEL TRANSMISSION IN DUAL CONNECTIVITY

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In 3GPP LTE Release 12.0, user equipments (UEs) can connect to more than one cell site simultaneously in a dual connectivity system. For example, the UE can connect to a master evolved node B (MeNB) and at least one secondary evolved node B (SeNB) simultaneously. When the UE connects to two cells, the UE can receive data bearers from both cells at substantially the same time. Dual connectivity can improve cell edge throughput, average sector throughput, and load balance between cells.

Technology is described for performing uplink channel transmissions at a user equipment (UE) configured for dual connectivity. The UE can transmit multiple channels in the same subframe, even when the UE is power limited. In other words, the UE can transmit the multiple channels in the same subframe while adhering to power limitations at the UE. In one example, the UE can transmit a first physical uplink control channel (PUCCH) for a primary cell (PCell) of a master cell group (MCG) and a second PUCCH for a special cell of a secondary cell group (SCG) in the same subframe. In another example, the UE can transmit a physical random access channel (PRACH) for the PCell or a secondary cell (SCell) of the MCG and a PUCCH for the special cell of the SCG in the same subframe. In yet another example, the UE can transmit a PUCCH for the PCell of the MCG and a PRACH for a special cell and/or the SCell of the SCG in the same subframe. If a total transmission power required to transmit the various channels in the same subframe would exceed a maximum transmission power (Pcmax), the UE can scale down or reduce a transmission power associated with one or more of the channels, such that the total transmission power is less than the maximum transmission power Pcmax in any overlapped portion.

In one configuration, the UE can scale down or reduce the transmit power based on a priority scheme in order to comply with the maximum transmission power. If the multiple channels (e.g., the two PUCCHs) have an equal priority level according to the priority scheme, then the transmit power for each of the multiple channels can be scaled down equally (i.e., equal power scaling is performed on each channel). In another example, the multiple channels can have an unequal priority level according to the priority scheme. In this case, the transmission power for the lower priority channel can be scaled down and the transmission power for the higher priority channel can remain unchanged (i.e., unequal or different weighted power scaling is performed on each channel). In yet another example, a channel that has a lower priority level as compared to another parallel channel according to the priority scheme can be dropped altogether. In this case, the channel with the lower priority level is not transmitted from the UE.

In dual connectivity, multiple channels can be transmitted substantially simultaneously from the UE. For example, the multiple channels can be transmitted in a same subframe or in a partial portion in time of the same subframe. The UE can perform multiple physical uplink control channel (PUCCH) transmissions in a simultaneous manner in a dual connectivity scenario. The PUCCH can refer to a PUCCH and a physical uplink shared channel (PUSCH) with uplink control information (UCI). In one example, the UE can transmit a first PUCCH to a primary cell (PCell) of a master cell group (MCG) and a second PUCCH to a special secondary cell (SCell) of a secondary cell group (SCG) in the same subframe or in a partial portion in time. In other words, the first PUCCH and the second PUCCH can be simultaneously transmitted from the UE (i.e., both PUCCHs are transmitted in the same subframe). In another example, the UE can transmit a physical random access channel (PRACH) to the PCell and/or the SCell of the MCG and a PUCCH to a special SCell in the same subframe. In other words, the PRACH and the PUCCH can be simultaneously transmitted from the UE. The simultaneous transmission from the UE between the two different cells can occur in substantially all single carrier frequency division multiple access (SC-FDMA) or some portions of time duration within the subframe.

Although parallel transmissions from the UE in dual connectivity are feasible when the UE is not power limited (i.e., when the UE is not subject to power restrictions), the parallel transmissions can be problematic when the UE is power-limited. In other words, parallel transmissions may not always be feasible when the UE is restricted in the amount of transmission power that can be used. In one example, the amount of power required for transmitting both channels in the same subframe from the UE (as opposed to transmitting the two channels in successive sub frames) can exceed a defined threshold. Therefore, the present technology described below defines a set of rules to be implemented at the UE when the UE operates in dual connectivity and is power limited. These rules describe techniques for transmitting the multiple channels in the same subframe without exceeding a maximum transmission power configured for a given UE. 3GPP Technical Specification (TS) 36.213 Section 5.1 provides details on legacy power control rules that can be applied to each serving cell, wherein the legacy power control rules can be applied at the UE prior to the defined set of rules described in the present technology being implemented at the UE.

In one configuration, a user equipment (UE) configured for dual connectivity can identify a first physical channel that includes a first uplink control information (UCI) and a second physical channel that includes a second UCI. The UE can apply power scaling to either a first physical channel transmission or a second physical channel transmission when a total transmission power of the UE would exceed a defined power value, such as a maximum transmit power ($P_{CMAX}$). The UE can scale down a transmission power for the second physical channel if a priority level for the first physical channel is higher than a priority for the second physical channel based on a type of first UCI and a type of second UCI. Alternatively, the UE can scale down a transmission power for the first physical channel if the priority level for the first physical channel is lower than the priority level for the second physical channel depending on the type of first UCI and the type of second UCI. In other words, when the two channels have different priority levels and the UE is power limited, only a less prioritized channel can be scaled down to avoid exceeding the defined power value. In addition, the first physical channel can include a Physical Uplink Control Channel (PUCCH) or a first Physical Uplink Shared Channel (PUSCH), and the second physical channel can include a PUCCH or a PUSCH.

In one example, the UE can perform the first physical channel transmission in uplink for a serving cell belonging to a Master Cell Group (MCG) and the second physical channel transmission in uplink for a serving cell belonging to a Secondary Cell Group (SCG).

In one configuration, the first physical channel to the MCG can have a higher priority than the second physical channel to the SCG when the first UCI includes a hybrid automatic repeat request-acknowledgement (HARQ-ACK) or a scheduling request (SR) and the second UCI includes channel state information (CSI). In another configuration, the first physical channel to the MCG can have a lower priority than the second physical channel to the SCG when the first UCI includes CSI and the second UCI includes HARQ-ACK or SR.

In one example, the first UCI and the second UCI can both include HARQ-ACK, or the first UCI and the second UCI can both include SR, or the first UCI and the second UCI can both include CSI. In each of these scenarios, the MCG has a higher priority. In other words, the first physical channel containing the first UCI to the MCG can have a higher priority than the second physical channel containing the second UCI to the SCG.

In one example, the first UCI can include HARQ-ACK and the second UCI can include SR, or alternatively, the first UCI can include SR and the second UCI can include HARQ-ACK. In either scenario, the first physical channel can have a higher priority than the second physical channel.

Figure 1A:
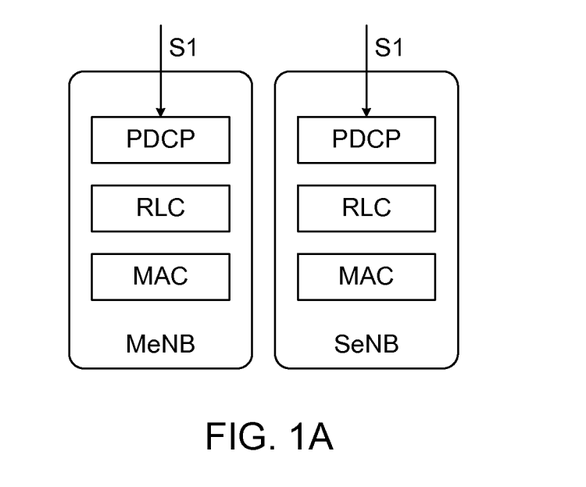
FIGS. 1A-1B illustrate dual connectivity architectures in accordance with an example.

In one configuration, the UE configured for dual connectivity can identify a physical random access channel (PRACH) of a MCG or a SCG. The UE can identify a PUCCH of a SCG or a MCG. The UE can determine that a priority level for the PRACH is higher than a priority order for the PUCCH. Therefore, the UE can apply power scaling to PUCCH transmissions so that a total transmission power of the UE does not exceed a defined power value, such as a maximum transmission power ($P_{CMAX}$). In one example, the PRACH can be prioritized higher than the PUCCH when the PRACH and PUCCH are both to be transmitted from the UE. The PRACH may not be scaled down while the PUCCH can be scaled down. The PRACH can be prioritized higher irrespective of whether the PRACH is for the MCG or the SCG FIG. 1A illustrates an exemplary dual connectivity architecture for a master evolved node B (MeNB) and a secondary evolved node B (SeNB). An S1-U can be terminated at the SeNB, and both the SeNB and the MeNB can include independent packet data convergence protocols (PDCPs), i.e., no bearer split. The MeNB and the SeNB can be connected to an Evolved Packet Core (EPC) via an S1 interface. For example, the MeNB and the SeNB can be connected to a serving gateway (S-GW) or mobility management entity (MME) via the S1 interface. The MeNB can include a PDCP layer, a radio link control (RLC) layer and a media access channel (MAC) layer. In addition, the SeNB can include a separate PDCP layer, RLC layer and MAC layer. The PDCP layer in the MeNB can receive data or control information from higher layers, and the PDCP layer in the SeNB can receive data or control information from higher layers.

Figure 1B:
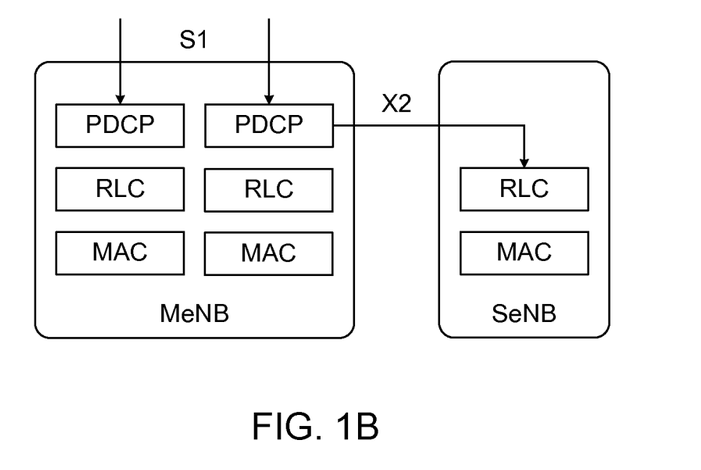

FIG. 1B illustrates another exemplary dual connectivity architecture for a master evolved node B (MeNB) and a secondary evolved node B (SeNB). The S1-U can be terminated at the MeNB and the bearer split can occur at the MeNB. In addition, an independent radio link control (RLC) can be present at the SeNB. The MeNB can be connected to an Evolved Packet Core (EPC) via an S1 interface. For example, the MeNB can be connected to a serving gateway (S-GW) or mobility management entity (MME) via the S1 interface. The MeNB can include a PDCP layer, an RLC layer and a media access channel (MAC) layer. The SeNB can include an RLC layer and a MAC layer. The PDCP layer in the MeNB can receive data and/or control information from higher layers. In one example, the data or control information can be communicated from the PDCP layer in the MeNB to the RLC and MAC layers in the MeNB. In addition, the data or control information can be communicated, from the PDCP layer in the MeNB, to the RLC layer in the SeNB via an X2 interface.

In dual connectivity, the UE can utilize multiple receivers (Rx) and transmitters (Tx) when operating in radio resource control (RRC) connected mode. The UE can be configured to utilize radio resources provided by two distinct schedulers that are located in the MeNB and the SeNB. Dual connectivity introduces various functions and procedures to realize control plane and user plane protocols that support the architectures described above. In one example, the master cell group (MCG) can refer to a group of serving cells associated with the MeNB, and the secondary cell group (SCG) can refer to a group of serving cells associated with the SeNB.

Figure 2A:
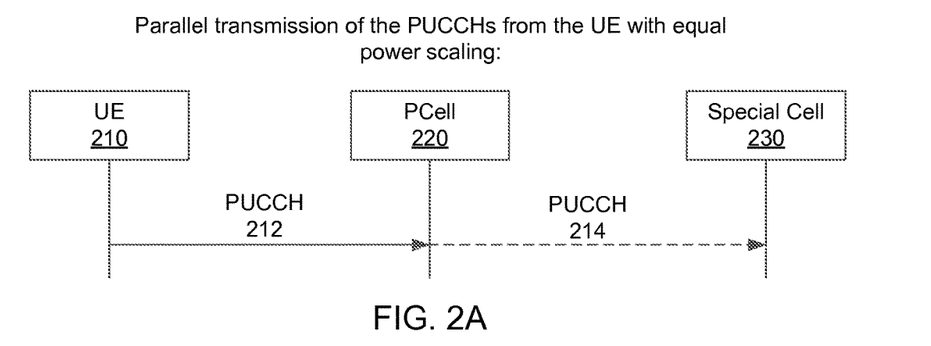
FIGS. 2A-2C illustrate parallel transmissions of a first physical uplink control channel (PUCCH) and a second PUCCH from a user equipment (UE) that operates in dual connectivity in accordance with an example.

FIG. 2A illustrates a parallel transmission of a first physical uplink control channel (PUCCH) 212 and a second PUCCH 214 from a user equipment (UE) 210 that operates in dual connectivity. The UE 210 can transmit the first PUCCH 212 to a primary cell (PCell) 220 of a master cell group (MCG). The UE 210 can transmit the second PUCCH 214 to a special cell 230 of a secondary cell group (SCG). The special cell 230 can be selected from a group of cells in the SCG. In one example, the UE 210 can transmit both the first PUCCH 212 and the second PUCCH 214 to the PCell 220 and the special cell 230, respectively, in the same subframe.

In one example, a total transmission power for transmitting both the first PUCCH 212 and the second PUCCH 214 in the same subframe can be larger than a maximum transmission power (Pcmax) configured for a given UE. The maximum transmission power can define a limit on the amount of power the UE 210 can use in a given subframe. When the UE 210 transmits multiple channels in the same subframe, the UE 210 can lower the total transmission power to be below the maximum transmission power. The UE 210 can lower the total transmission power by performing power scaling. In other words, the UE 210 can use power scaling to reduce a transmit power associated with transmitting the first PUCCH 212 and/or the second PUCCH 214, such that the total transmission power for transmitting both the first PUCCH 212 and the second PUCCH 214 is below the maximum transmission power.

In one configuration, the UE 210 can implement an equal power scaling for the first PUCCH 212 and the second PUUCH 214. In other words, the multiple PUCCHs have an equal priority level, and therefore, are scaled down equally and then transmitted in the same subframe. The first PUCCH 212 and the second PUCCH 214 can have the equal priority level in accordance with a priority scheme implemented at the UE 210. As a non-limiting example, the UE 210 can reduce the transmit power of the first PUCCH 212 by 10%. In addition, the UE 210 can reduce the transmit power of the second PUCCH 214 by 10%. When the equal power scaling of the two PUCCHs results in the total transmission power being less than the maximum transmission power (Pcmax), the UE 210 can transmit both the first PUCCH 212 and the second PUCCH 214 (each with a 10% reduction in transmit power) in the same subframe. In another example, the first PUCCH 212 and the second PUCCH 214 can each be scaled down to 80% of an original value, but a final power for each PUCCH after scaling can be different with respect to each other. In this configuration, both the first PUCCH 212 and the second PUCCH 214 are regarded as having the same priority level based on the priority scheme implemented at the UE 210. The power scaling can be applied for subframes containing the PUCCHs or only for overlapped portions (e.g., overlapped symbols) in the subframes. Therefore, even when the UE 210 is power limited, the UE 210 can simultaneously transmit the two PUCCHs (i.e., in the same subframe) by utilizing power scaling.

Figure 2B:
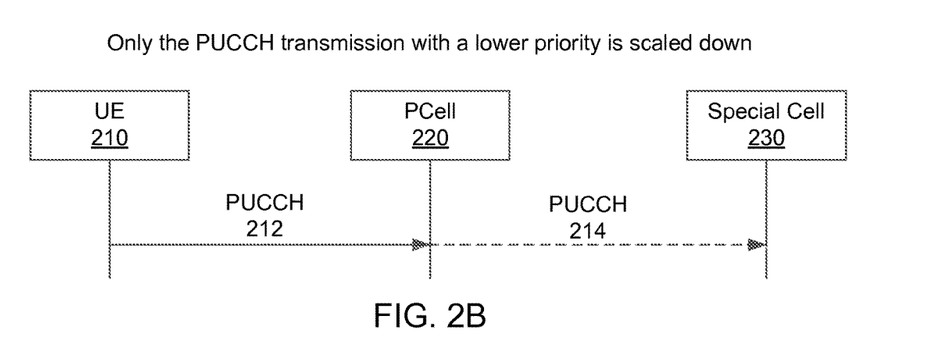

FIG. 2B illustrates a parallel transmission of a first physical uplink control channel (PUCCH) 212 and a second PUCCH 214 from a user equipment (UE) 210 that operates in dual connectivity. The first PUCCH 212 can be transmitted to a PCell 220 and the second PUCCH 214 can be transmitted to a special cell 220. The UE 210 can implement an unequal power scaling for the first PUCCH 212 and the second PUUCH 214. In other words, the multiple PUCCHs have an unequal priority level, and therefore, are scaled down unequally and then transmitted in the same subframe. In this configuration, a weighted power scaling technique with different weights can be applied to the various PUCCHs that are transmitted from the UE 210. The UE 210 can apply the unequal power scaling, such that a total transmission power for simultaneously transmitting both the first PUCCH 212 and the second PUCCH 214 in the same subframe is less than a maximum transmission power (Pcmax) allowed for the UE 210 for a given subframe.

In one configuration, when the first PUCCH 212 has a higher priority as compared to the second PUCCH 214, the first PUCCH 212 is not scaled down while the second PUCCH 214 can be scaled down such that the total transmission power for transmitting both the first PUCCH 212 and the second PUCCH 214 is less than the maximum transmission power (Pcmax). Similarly, when the second PUCCH 214 has a higher priority as compared to the first PUCCH 212, the second PUCCH 214 is not scaled down while the first PUCCH 212 can be scaled down such that the total transmission power for transmitting both the first PUCCH 212 and the second PUCCH 214 is less than the maximum transmission power (Pcmax).

The first PUCCH 212 and the second PUCCH 214 can have the unequal priority level in accordance with a priority scheme implemented at the UE 210. As a non-limiting example, the UE 210 can reduce the transmit power of the first PUCCH 212 by 15% and not reduce the transmit power of the second PUCCH 214. When the unequal power scaling of the two PUCCHs results in the total transmission power being less than the maximum transmission power (Pcmax), the UE 210 can transmit both the first PUCCH 212 and the second PUCCH 214 in the same subframe. In this configuration, the first PUCCH 212 and the second PUCCH 214 are regarded as not having the same priority level based on the priority scheme implemented at the UE 210. Since the transmit power for the first PUCCH 212 is reduced by 15% and the transmit power for the second PUCCH 214 is not reduced, the first PUCCH 212 has a higher priority level than the second PUCCH 214. In other words, a higher priority level does not result in a reduction in transmit power. The power scaling can be applied for subframes containing the PUCCHs or only for overlapped portions (e.g., overlapped symbols) in the subframes. Therefore, even when the UE 210 is power limited, the UE 210 can simultaneously transmit the two PUCCHs (i.e., in the same subframe) by utilizing power scaling.

As described above, different weighted power scaling can be applied to different PUCCHs that are transmitted from the UE 210. In one example, a first PUCCH 212 containing a scheduling request (SR) or a hybrid automatic repeat request acknowledgement (HARQ-ACK) can have a higher priority level than a second PUCCH 214 containing channel state information (CSI). In this example, a transmit power for the second PUCCH 214 containing the CSI can be scaled down, whereas a transmit power for the first PUCCH 212 containing the SR or HARQ-ACK may not be scaled down.

In one example, the priority levels for each of the channels can be determined based on a cell index. The priority level for each serving cell can be configured by radio resource control (RRC) signaling. A cell index with a lower value can be more prioritized than a cell index with a higher value. As a non-limiting example, if a cell index for the first PUCCH 212 of the MCG is 0 and a cell index for the second PUCCH 214 of the SCG is 2, then the first PUCCH 212 of the MCG is more prioritized than the second PUCCH 214 of the SCG. Therefore, a transmit power for the second PUCCH 214 can be scaled down, whereas a transmit power for the first PUCCH 212 may not be scaled down.

In one example, the priority levels for each of the channels can be determined based on a cell group. Since a signaling radio bearer (SRB) is transmitted via the MCG in dual connectivity, the first PUCCH 212 of the MCG can be more prioritized than the second PUCCH 214 of the SCG. In another example, the priority levels for each of the channels can be determined based on a quality of service (QoS) of a physical downlink shared channel (PDSCH) for each serving cell or cell group. In yet another example, the priority levels for each of the channels can be determined based on a service type of the PDSCH, such as voice over internet protocol (VoIP) or semi persistent scheduling (SPS).

Figure 2C:
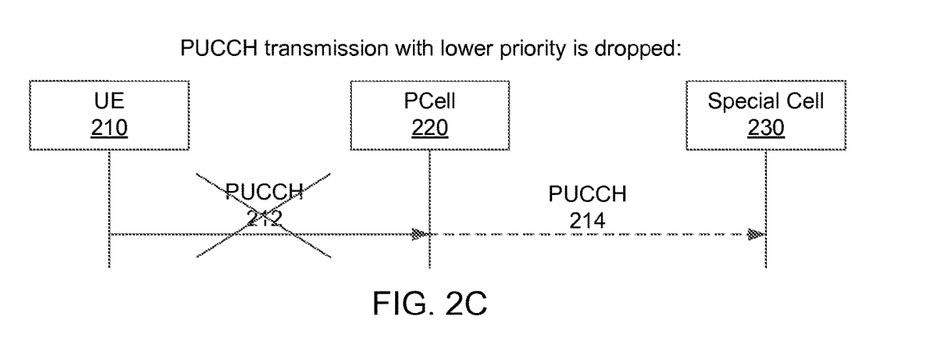

FIG. 2C illustrates a transmission of either a first physical uplink control channel (PUCCH) 212 or a second PUCCH 214 from a user equipment (UE) 210 that operates in dual connectivity. The first PUCCH 212 can be transmitted to a PCell 220 or the second PUCCH 214 can be transmitted to a special cell 230. The multiple PUCCHs can have an unequal priority level, and the PUCCH with a lower priority level can be dropped and the PUCCH with a higher priority level can be transmitted from the UE 210. The priority levels for each of the channels can be determined based on a priority scheme implemented at the UE 210. In the example shown in FIG. 2C, the first PUCCH 212 can have a lower priority level than the second PUCCH 214 based on the priority scheme. Therefore, the first PUCCH 212 can be dropped and only the second PUCCH 214 can be transmitted to the special cell 230. Therefore, when the UE 210 is power limited, the UE 210 can ensure that transmission of the channel complies with a maximum transmission power for a given subframe by dropping the channel with the lower priority level.

In one configuration, legacy power control rules can be applied, as further defined in 3GPP TS 36.213 Section 5.1. After the legacy power control rules are applied, a total transmit power can be adjusted to not exceed the maximum transmission power (Pcmax) on an overlapped portion of a given subframe. This technique can also be applicable to other physical channel combinations, such as the physical uplink shared channel (PUSCH), physical uplink control channel (PUCCH), sounding reference signal (SRS), physical random access channel (PRACH), etc. In this configuration, the legacy power control rules can be applied for each cell group and the total transmit power is adjusted to not exceed Pcmax on any overlapped portion. For cells within the SCG, the legacy power control rules can be applied by replacing a primary cell with a special SCell.

This configuration can be applied to PUCCHs having the same priority level. For instance, when the first PUCCH 212 of the MCG carries the HARQ-ACK or SR and the second PUCCH 214 of the SCG carries the CSI (i.e., which are carried with different priorities), the second PUCCH 214 of the SCG is dropped and the first PUCCH 212 of the MCG is transmitted. After that, the UE 210 can adjust the total transmit power to not exceed Pcmax on any overlapped portion. When the PUCCHs of the MCG and the SCG carries CSIs (i.e., which are carried with the same priorities), the UE 210 can just adjust the total transmit power to not exceed Pcmax on any overlapped portion.

Figure 3A:
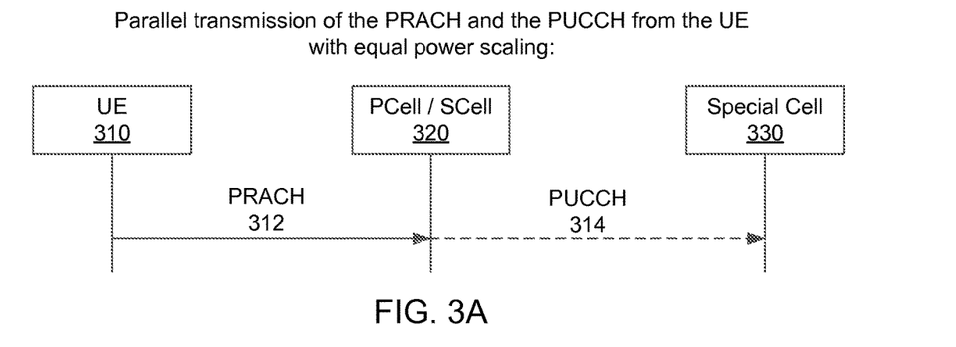
FIGS. 3A-3C illustrate parallel transmissions of a physical random access channel (PRACH) and a physical uplink control channel (PUCCH) from a user equipment (UE) that operates in dual connectivity in accordance with an example.

FIG. 3A illustrates a parallel transmission of a physical random access channel (PRACH) 312 and a physical uplink control channel (PUCCH) 314 from a user equipment (UE) 310 that operates in dual connectivity. The UE 310 can transmit the PRACH 312 to a primary cell (PCell) or a secondary cell (SCell) 320 of a master cell group (MCG). The UE 310 can transmit the PUCCH 314 to a special cell 330 of a secondary cell group (SCG). The special cell 330 can be selected from a group of cells in the SCG. In one example, the UE 310 can transmit both the PRACH 312 and the PUCCH 314 to the PCell or SCell 320 and the special cell 330, respectively, in the same subframe.

In one example, a total transmission power for transmitting both the PRACH 312 and the PUCCH 314 in the same subframe can be larger than a maximum transmission power (Pcmax). The maximum transmission power can define a limit on the amount of power the UE 310 can use in a given subframe. When the UE 310 transmits multiple channels in the same subframe, the UE 310 can lower the total transmission power to be below the maximum transmission power. The UE 310 can lower the total transmission power by performing power scaling. In other words, the UE 310 can use power scaling to reduce a transmit power associated with transmitting the PRACH 312 or the PUCCH 314, such that the total transmission power for transmitting both the PRACH 312 and the PUCCH 314 is below the maximum transmission power.

In one configuration, the UE 310 can implement an equal power scaling for the PRACH 312 and the PUUCH 314. In other words, the multiple channels have an equal priority level, and therefore, are scaled down equally and then transmitted in the same subframe. The PRACH 312 and the PUCCH 314 can have the equal priority level in accordance with a priority scheme implemented at the UE 310. As a non-limiting example, the UE 310 can reduce the transmit power of the PRACH 312 by 20%. In addition, the UE 310 can reduce the transmit power of the PUCCH 314 by 20%. When the equal power scaling of the PRACH and PUCCH results in the total transmission power being less than the maximum transmission power (Pcmax), the UE 310 can transmit both the PRACH 312 and the PUCCH 314 (each with a 20% reduction in transmit power) in the same subframe. In this configuration, both the PRACH 312 and the PUCCH 314 are regarded as having the same priority level based on the priority scheme implemented at the UE 310. The power scaling can be applied for subframes containing the PRACH and PUCCH or only for overlapped portions (e.g., overlapped symbols) in the subframes. Therefore, even when the UE 310 is power limited, the UE 310 can simultaneously transmit the PRACH and PUCCH (i.e., in the same subframe) by utilizing power scaling.

Figure 3B:
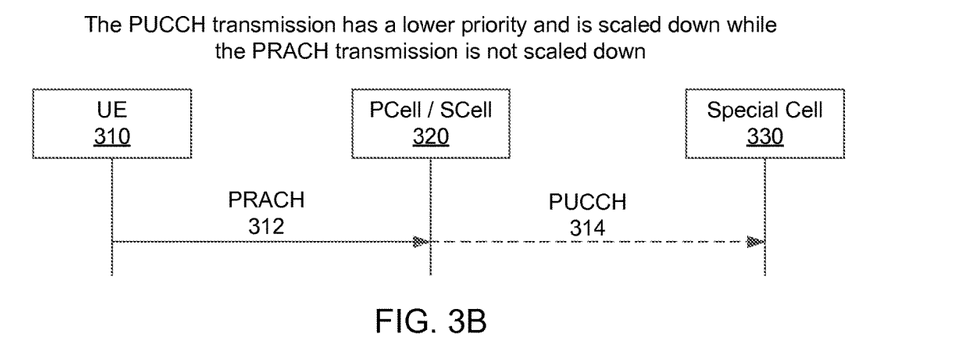

FIG. 3B illustrates a parallel transmission of a physical random access channel (PRACH) 312 and a physical uplink control channel (PUCCH) 314 from a user equipment (UE) 310 that operates in dual connectivity. The PRACH 312 can be transmitted to a PCell or SCell 320 and the PUCCH 314 can be transmitted to a special cell 330. The UE 310 can implement an unequal power scaling for the PRACH 312 and the PUUCH 314. In other words, the multiple channels have an unequal priority level, and therefore, are scaled down unequally and then transmitted in the same subframe. In this configuration, a weighted power scaling technique with different weights can be applied to the various channels that are transmitted from the UE 310. The UE 310 can apply the unequal power scaling, such that a total transmission power for simultaneously transmitting both the PRACH 312 and the PUCCH 314 in the same subframe is less than a maximum transmission power (Pcmax) allowed for the UE 310 for a given subframe.

In one configuration, the PRACH 312 has a higher priority as compared to the PUCCH 314. Therefore, the PRACH 312 is not scaled down while the PUCCH 314 can be scaled down such that the total transmission power for transmitting both the PRACH 312 and the PUCCH 314 is less than the maximum transmission power (Pcmax).

The PRACH 312 and the PUCCH 314 can have the unequal priority level in accordance with a priority scheme implemented at the UE 310. As a non-limiting example, the UE 310 can reduce the transmit power of the PUCCH 314 by 25%, whereas the UE 310 does not reduce the transmit power of the PRACH 312. When the unequal power scaling of the two channels results in the total transmission power being less than the maximum transmission power (Pcmax), the UE 310 can transmit both the PRACH 312 and the PUCCH 314 in the same subframe. In this configuration, the PRACH 312 and the PUCCH 314 are regarded as not having the same priority level based on the priority scheme implemented at the UE 310. Since the transmit power for the PRACH 312 is not reduced and the transmit power for the PUCCH 314 is reduced by 25%, the PRACH 312 has a higher priority level than the PUCCH 314. In other words, a lower priority level corresponds to a reduction in transmit power. The power scaling can be applied for subframes containing the channels or only for overlapped portions (e.g., overlapped symbols) in the subframes. Therefore, even when the UE 310 is power limited, the UE 310 can simultaneously transmit the two channels (i.e., in the same subframe) by utilizing power scaling.

As described above, different weighted power scaling can be applied to different channels that are transmitted from the UE 310. In one example, a PRACH 312 containing a scheduling request (SR) or a hybrid automatic repeat request acknowledgement (HARQ-ACK) can have a higher priority level than a PUCCH 314 containing channel state information (CSI). In this example, a transmit power for the PUCCH 314 containing the CSI can be scaled down, whereas a transmit power for the PRACH 312 containing the SR or HARQ-ACK may not be scaled down.

In one example, the priority levels for each of the channels can be determined based on a cell index. The priority level for each serving cell can be configured by radio resource control (RRC) signaling. A cell index with a lower value can be more prioritized than a cell index with a higher value. As a non-limiting example, if a cell index for the PRACH 312 of the MCG is 1 and a cell index for the PUCCH 314 of the SCG is 3, then the PRACH 312 of the MCG is more prioritized than the PUCCH 314 of the SCG. Therefore, a transmit power for the PUCCH 314 can be scaled down, whereas a transmit power for the PRACH 312 is not scaled down.

In one example, the priority levels for each of the channels can be determined based on a cell group. Since a signaling radio bearer (SRB) is transmitted via the MCG in dual connectivity, the PRACH 312 of the MCG can be more prioritized than the PUCCH 314 of the SCG. In another example, the priority levels for each of the channels can be determined based on a quality of service (QoS) of a physical downlink shared channel (PDSCH) for each serving cell or cell group. In yet another example, the priority levels for each of the channels can be determined based on a service type of the PDSCH, such as voice over internet protocol (VoIP) or semi persistent scheduling (SPS).

Figure 3C:
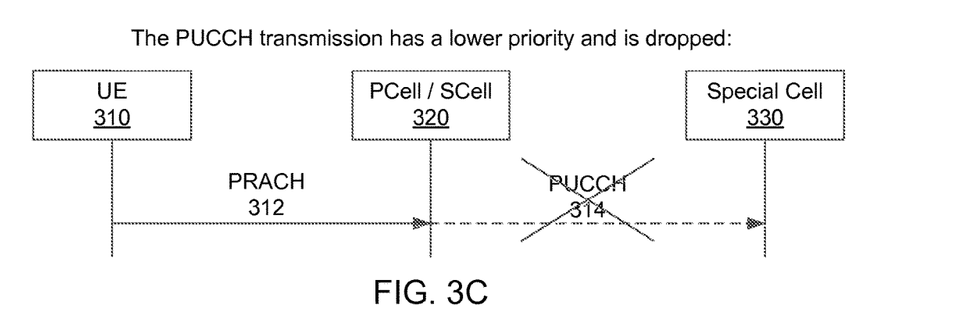

FIG. 3C illustrates a transmission of either a physical random access control channel (PRACH) 312 or a physical uplink control channel (PUCCH) 314 from a user equipment (UE) 310 that operates in dual connectivity. The PRACH 312 can be transmitted to a PCell or SCell 320 or the PUCCH 314 can be transmitted to a special cell 330. The multiple channels can have an unequal priority level, and the channel with a lower priority level can be dropped and the channel with a higher priority level can be transmitted from the UE 310. The priority levels for each of the channels can be determined based on a priority scheme implemented at the UE 310. In the example shown in FIG. 3C, the PRACH 312 can have a higher priority level than the PUCCH 314 based on the priority scheme. Therefore, the PUCCH 314 can be dropped and only the PRACH 312 can be transmitted to the PCell or SCell 320. Therefore, when the UE 310 is power limited, the UE 310 can ensure that transmission of the channel complies with a maximum transmission power for a given subframe by dropping the channel with the lower priority level.

Figure 4A:
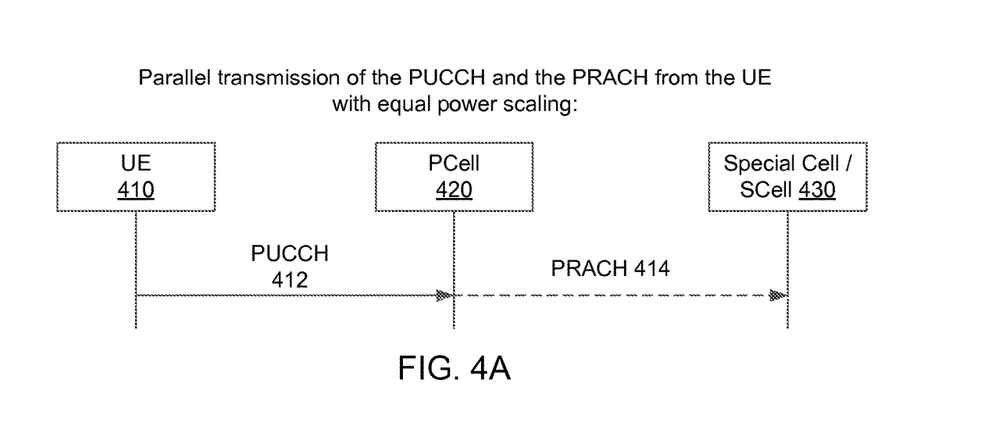
FIGS. 4A-4C illustrate parallel transmissions of a physical uplink control channel (PUCCH) and a physical random access channel (PRACH) from a user equipment (UE) that operates in dual connectivity in accordance with an example.

FIG. 4A illustrates a parallel transmission of a physical uplink control channel (PUCCH) 412 and a physical random access channel (PRACH) 414 from a user equipment (UE) 310 that operates in dual connectivity. The UE 410 can transmit the PUCCH 412 to a primary cell (PCell) 420 of a master cell group (MCG). The UE 410 can transmit the PRACH 414 to a special cell or SCell 430 of a secondary cell group (SCG). The special cell can be selected from a group of cells in the SCG. In one example, the UE 410 can transmit both the PUCCH 412 and the PRACH 414 to the PCell 420 and the special cell or SCell 430, respectively, in the same subframe.

In one example, a total transmission power for transmitting both the PUCCH 412 and the PRACH 414 in the same subframe can be larger than a maximum transmission power (Pcmax). The maximum transmission power can define a limit on the amount of power the UE 410 can use in a given subframe. When the UE 410 transmits multiple channels in the same subframe, the UE 410 can lower the total transmission power to be below the maximum transmission power. The UE 410 can lower the total transmission power by performing power scaling. In other words, the UE 410 can use power scaling to reduce a transmit power associated with transmitting the PUCCH 412 or the PRACH 414, such that the total transmission power for transmitting both the PUCCH 412 and the PRACH 414 is below the maximum transmission power.

In one configuration, the UE 410 can implement an equal power scaling for the PUCCH 412 and the PRACH 414. In other words, the multiple channels have an equal priority level, and therefore, are scaled down equally and then transmitted in the same subframe. The PUCCH 412 and the PRACH 414 can have the equal priority level in accordance with a priority scheme implemented at the UE 410. As a non-limiting example, the UE 410 can reduce the transmit power of the PUCCH 412 by 15%. In addition, the UE 410 can reduce the transmit power of the PRACH 414 by 15%. When the equal power scaling of the PUCCH and PRACH results in the total transmission power being less than the maximum transmission power (Pcmax), the UE 410 can transmit both the PUCCH 412 and the PRACH 414 (each with a 15% reduction in transmit power) in the same subframe. In this configuration, both the PUCCH 412 and the PRACH 414 are regarded as having the same priority level based on the priority scheme implemented at the UE 410. The power scaling can be applied for subframes containing the PUCCH and PRACH or only for overlapped portions (e.g., overlapped symbols) in the subframes. Therefore, even when the UE 410 is power limited, the UE 410 can simultaneously transmit the PUCCH and PRACH (i.e., in the same subframe) by utilizing power scaling.

Figure 4B:
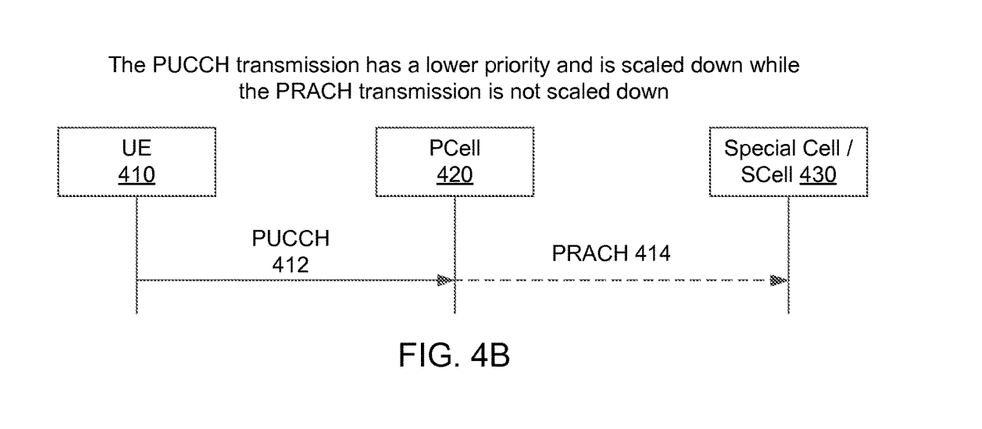

FIG. 4B illustrates a parallel transmission of a physical uplink control channel (PUCCH) 412 and a physical random access channel (PRACH) 414 from a user equipment (UE) 410 that operates in dual connectivity. The PUCCH 412 can be transmitted to a PCell 420 and the PRACH 414 can be transmitted to a special cell or SCell 430. The UE 410 can implement an unequal power scaling for the PUCCH 412 and the PRACH 414. In other words, the multiple channels have an unequal priority level, and therefore, are scaled down unequally and then transmitted in the same subframe. In this configuration, a weighted power scaling technique with different weights can be applied to the various channels that are transmitted from the UE 410. The UE 410 can apply the unequal power scaling, such that a total transmission power for simultaneously transmitting both the PUCCH 412 and the PRACH 414 in the same subframe is less than a maximum transmission power (Pcmax) allowed for the UE 410 for a given subframe.

In one configuration, the PRACH 414 has a higher priority as compared to the PUCCH 412. Therefore, the PRACH 414 is not scaled down while the PUCCH 412 can be scaled down such that the total transmission power for transmitting both the PRACH 414 and the PUCCH 412 is less than the maximum transmission power (Pcmax).

The PUCCH 412 and the PUCCH 414 can have the unequal priority level in accordance with a priority scheme implemented at the UE 410. As a non-limiting example, the UE 410 can reduce the transmit power of the PUCCH 412 by 30%, whereas the transmit power of the PRACH 414 is not reduced. When the unequal power scaling of the two channels results in the total transmission power being less than the maximum transmission power (Pcmax), the UE 410 can transmit both the PUCCH 412 and the PRACH 414 in the same subframe. In this configuration, the PUCCH 412 and the PRACH 414 are regarded as not having the same priority level based on the priority scheme implemented at the UE 410. Since the transmit power for the PUCCH 412 is reduced by 30% while the transmit power for the PRACH 414 is not reduced, the PUCCH 414 has a lower priority level than the PRACH 412. In other words, a lower priority level corresponds to a reduction in transmit power. The power scaling can be applied for subframes containing the channels or only for overlapped portions (e.g., overlapped symbols) in the subframes. Therefore, even when the UE 410 is power limited, the UE 410 can simultaneously transmit the two channels (i.e., in the same subframe) by utilizing power scaling.

Figure 4C:
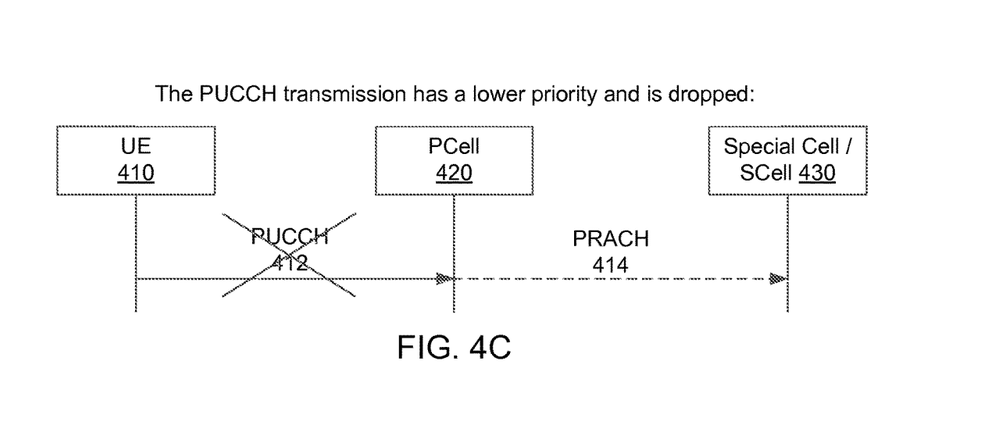

FIG. 4C illustrates a transmission of either a physical uplink control channel (PUCCH) 412 or a physical random access control channel (PRACH) 414 from a user equipment (UE) 410 that operates in dual connectivity. The PUCCH 412 can be transmitted to a PCell 420 or the PRACH 414 can be transmitted to a special cell or SCell 430. The multiple channels can have an unequal priority level, and the channel with a lower priority level can be dropped and the channel with a higher priority level can be transmitted from the UE 410. The priority levels for each of the channels can be determined based on a priority scheme implemented at the UE 410. In the example shown in FIG. 4C, the PRACH 414 can have a higher priority level than the PUCCH 412 based on the priority scheme. Therefore, the PUCCH 412 can be dropped and only the PRACH 414 can be transmitted to the PCell 420. Therefore, when the UE 410 is power limited, the UE 410 can ensure that transmission of the channel complies with a maximum transmission power for a given subframe by dropping the channel with the lower priority level.

Figure 5:
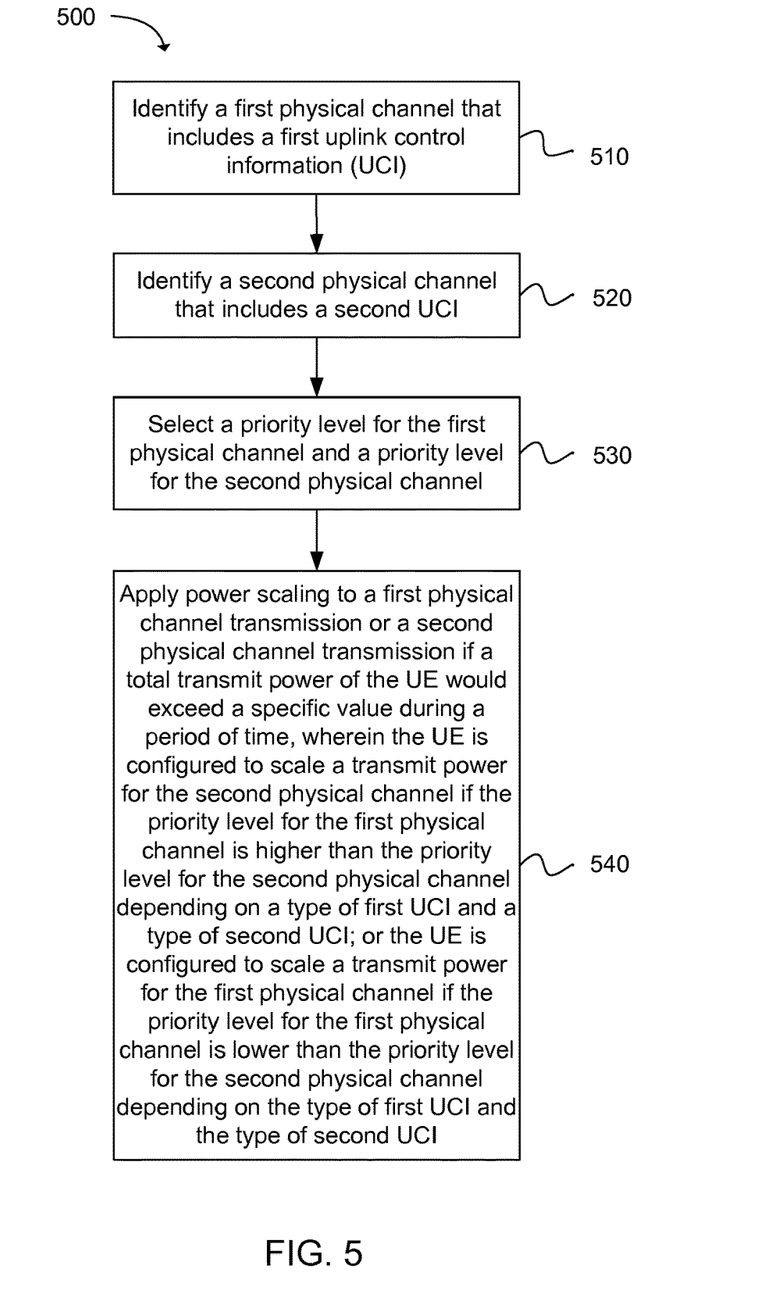
FIG. 5 depicts functionality of a user equipment (UE) configured for dual connectivity in accordance with an example.

Another example provides functionality 500 of a user equipment (UE) configured for dual connectivity, as shown in the flow chart in FIG. 5. The functionality can be implemented as a method or the functionality can be executed as instructions on a machine, where the instructions are included on at least one computer readable medium or one non-transitory machine readable storage medium. One or more processors of the UE can be configured to identify a first physical channel that includes a first uplink control information (UCI), as in block 510. The one or more processors can be configured to identify a second physical channel that includes a second UCI, as in block 520. The one or more processors can be configured to select a priority level for the first physical channel and a priority level for the second physical channel, as in block 530. The one or more processors can be configured to apply power scaling to a first physical channel transmission or a second physical channel transmission if a total transmit power of the UE would exceed a specific value during a period of time, wherein: the UE is configured to scale a transmit power for the second physical channel if the priority level for the first physical channel is higher than the priority level for the second physical channel depending on a type of first UCI and a type of second UCI; or the UE is configured to scale a transmit power for the first physical channel if the priority level for the first physical channel is lower than the priority level for the second physical channel depending on the type of first UCI and the type of second UCI, as in block 540.

In one example, the one or more processors can be further configured to perform the first physical channel transmission in uplink for a serving cell belonging to a Master Cell Group (MCG). In another example, the one or more processors can be further configured to perform the second physical channel transmission in uplink for a serving cell belonging to a Secondary Cell Group (SCG). In yet another example, the one or more processors can be further configured to determine that the priority level for the first physical channel that includes the first UCI is higher than the priority level for the second physical channel that includes the second UCI if the first UCI includes a hybrid automatic repeat request-acknowledgement (HARQ-ACK) or a scheduling request (SR) and the second UCI includes channel state information (CSI).

In one example, the one or more processors can be further configured to determine that the priority level for the first physical channel that includes the first UCI is lower than the priority level for the second physical channel that includes the second UCI if the first UCI includes channel state information (CSI) and the second UCI includes a hybrid automatic repeat request-acknowledgement (HARQ-ACK) or a scheduling request (SR). In another example, the one or more processors can be further configured to determine that the priority level for the first physical channel that includes the first UCI is higher than the priority level for the second physical channel that includes the second UCI, wherein: the first UCI and the second UCI both include a hybrid automatic repeat request-acknowledgement (HARQ-ACK); or the first UCI and the second UCI both include a scheduling request (SR); or the first UCI and the second UCI both include channel state information (CSI).

In one example, the one or more processors can be further configured to determine that the priority level for the first physical channel that includes the first UCI is higher than the priority level for the second physical channel that includes the second UCI, wherein: the first UCI includes a hybrid automatic repeat request-acknowledgement (HARQ-ACK) and the second UCI includes a scheduling request (SR); or the first UCI includes a SR and the second UCI includes a HARQ-ACK. In another example, the specific value is configured as a maximum transmit power ($P_{CMAX}$) such that the total transmit power for the first physical channel and the second physical channel shall not exceed the specific value on an overlapping time period. In yet another example, the first physical channel is a first Physical Uplink Control Channel (PUCCH) or a first Physical Uplink Shared Channel (PUSCH); and the second physical channel is a second PUCCH or a second PUSCH. In addition, the UE can include an antenna, a touch sensitive display screen, a speaker, a microphone, a graphics processor, an application processor, an internal memory, or a non-volatile memory port.

Figure 6:
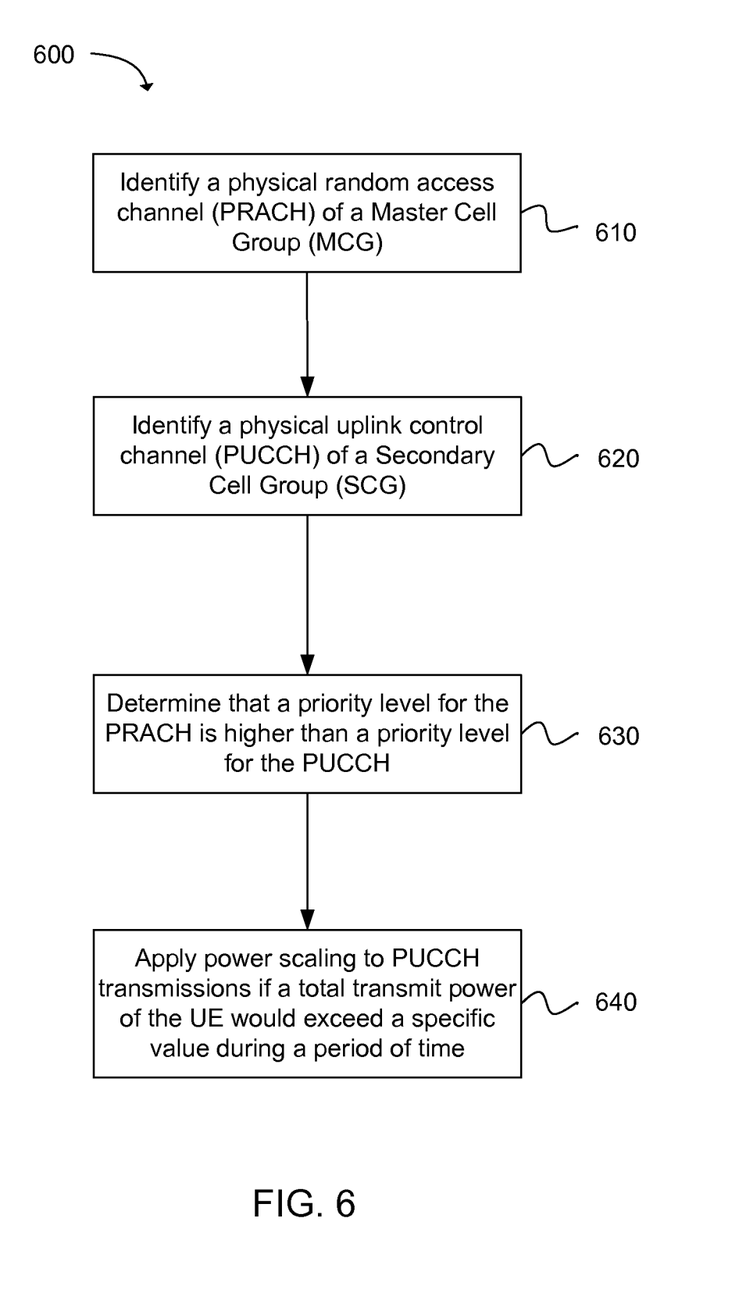
FIG. 6 depicts functionality of a user equipment (UE) configured for dual connectivity in accordance with an example.

Another example provides functionality 600 of a user equipment (UE) configured for dual connectivity, as shown in the flow chart in FIG. 6. The functionality can be implemented as a method or the functionality can be executed as instructions on a machine, where the instructions are included on at least one computer readable medium or one non-transitory machine readable storage medium. One or more processors of the UE can be configured to identify a physical random access channel (PRACH) of a Master Cell Group (MCG), as in block 610. The one or more processors can be configured to identify a physical uplink control channel (PUCCH) of a Secondary Cell Group (SCG), as in block 620. The one or more processors can be configured to determine that a priority level for the PRACH is higher than a priority level for the PUCCH, as in block 630. The one or more processors can be configured to apply power scaling to PUCCH transmissions if a total transmit power of the UE would exceed a specific value during a period of time, as in block 640.

In one example, the one or more processors can be further configured to: transmit the PRACH on a primary cell (PCell) or a secondary cell (SCell) of the MCG; or transmit the PRACH on a secondary cell of the SCG. In another example, the one or more processors can be further configured to: transmit the PUCCH on a primary cell (PCell) of the MCG; or transmit the PUCCH on a special secondary cell (SCell) of the SCG. In yet another example, the specific value can be configured as a maximum transmit power ($P_{CMAX}$) such that the total transmit power for the PRACH and the PUCCH shall not exceed the specific value on an overlapping time period.

Figure 7:
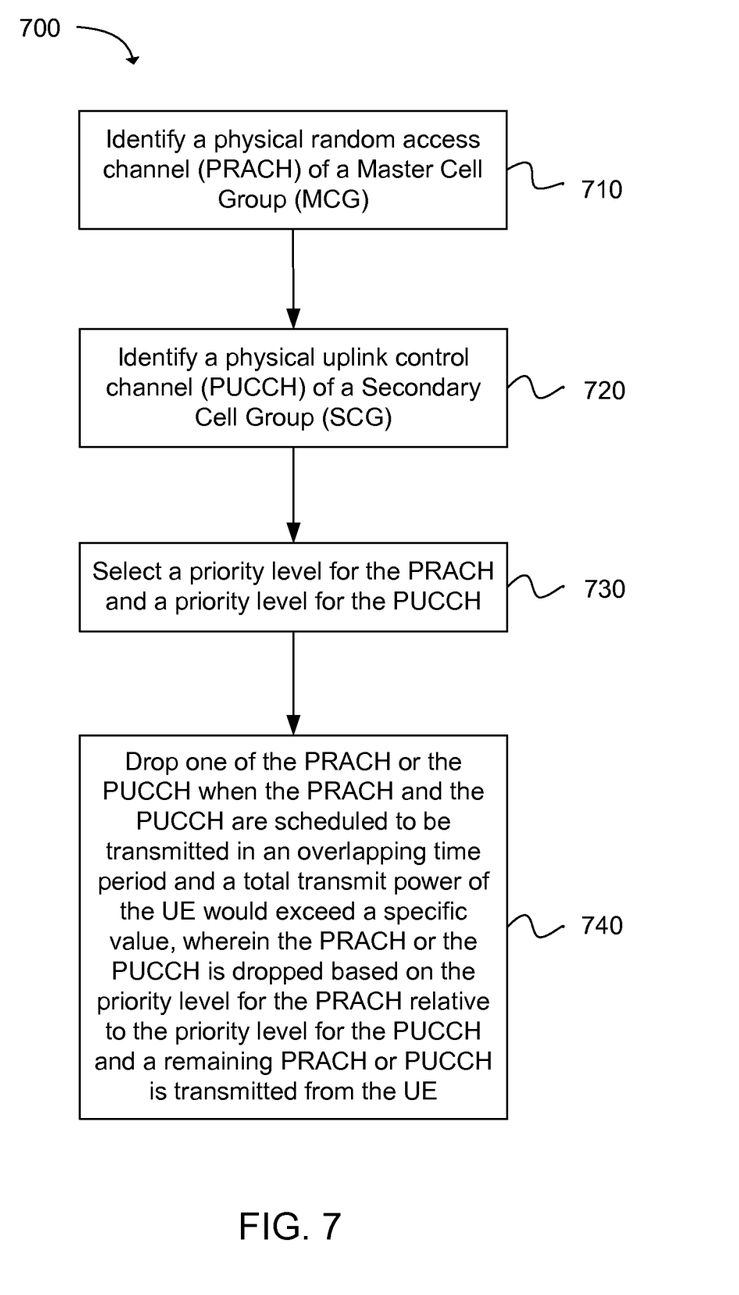
FIG. 7 depicts functionality of a user equipment (UE) configured for dual connectivity in accordance with an example.

Another example provides functionality 700 of a user equipment (UE) configured for dual connectivity, as shown in the flow chart in FIG. 7. The functionality can be implemented as a method or the functionality can be executed as instructions on a machine, where the instructions are included on at least one computer readable medium or one non-transitory machine readable storage medium. One or more processors of the UE can be configured to identify a physical random access channel (PRACH) of a Master Cell Group (MCG), as in block 710. The one or more processors can be configured to identify a physical uplink control channel (PUCCH) of a Secondary Cell Group (SCG), as in block 720. The one or more processors can be configured to select a priority level for the PRACH and a priority level for the PUCCH, as in block 730. The one or more processors can be configured to drop one of the PRACH or the PUCCH when the PRACH and the PUCCH are scheduled to be transmitted in an overlapping time period and a total transmit power of the UE would exceed a specific value, wherein the PRACH or the PUCCH is dropped based on the priority level for the PRACH relative to the priority level for the PUCCH and a remaining PRACH or PUCCH is transmitted from the UE, as in block 740.

In one example, the one or more processors can be further configured to: transmit the PRACH to a primary cell (PCell) or a secondary cell (SCell) of the MCG; or transmit the PUCCH to a special secondary cell (SCell) of the SCG. In another example, the one or more processors can be further configured to: drop the PRACH when the priority level for the PRACH is less than the priority level for the PUCCH; or drop the PUCCH when the priority level for the PRACH is greater than the priority level for the PUCCH. In yet another example, the specific value can be configured as a maximum transmit power ($P_{CMAX}$) such that the total transmit power for the PRACH and the PUCCH shall not exceed the specific value on an overlapping time period.

Figure 8:
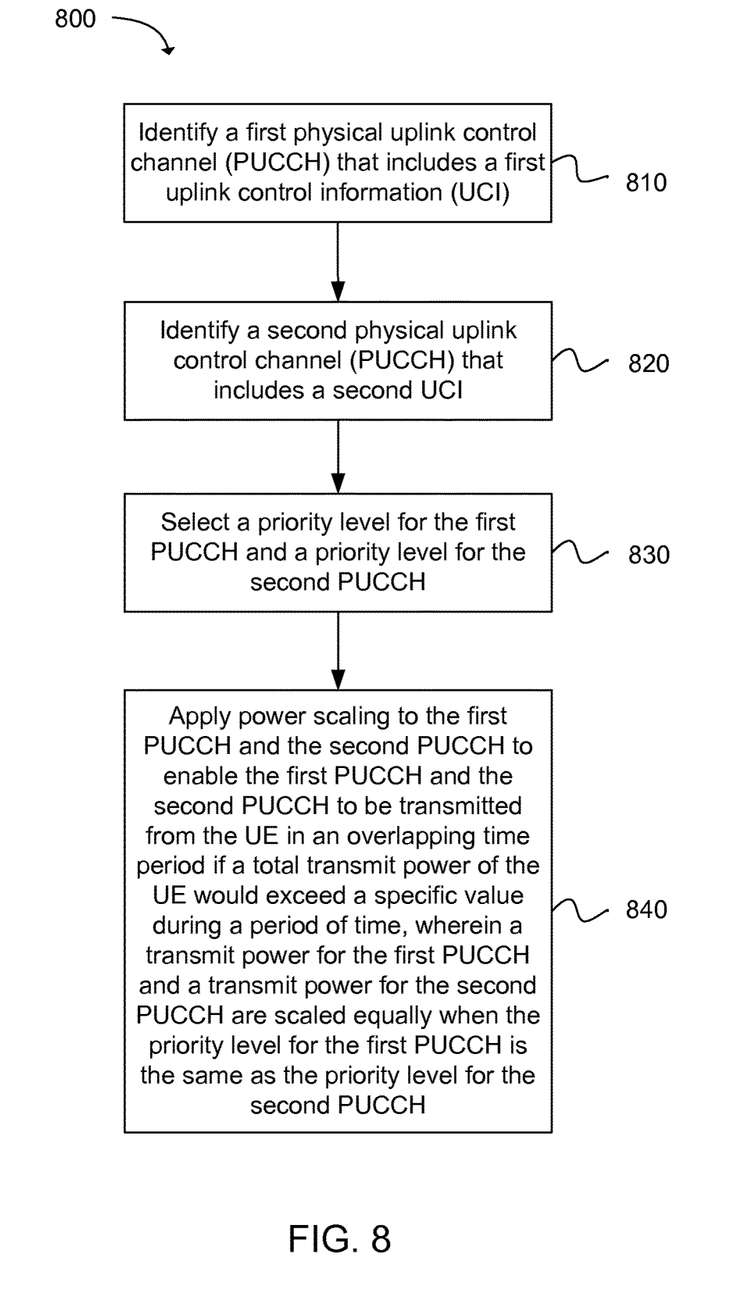
FIG. 8 depicts functionality of a user equipment (UE) configured for dual connectivity in accordance with an example.

Another example provides functionality 800 of a user equipment (UE) configured for dual connectivity, as shown in the flow chart in FIG. 8. The functionality can be implemented as a method or the functionality can be executed as instructions on a machine, where the instructions are included on at least one computer readable medium or one non-transitory machine readable storage medium. One or more processors of the UE can be configured to identify a first physical uplink control channel (PUCCH) that includes a first uplink control information (UCI), as in block 810. The one or more processors can be configured to identify a second physical uplink control channel (PUCCH) that includes a second UCI, as in block 810. The one or more processors can be configured to select a priority level for the first PUCCH and a priority level for the second PUCCH, as in block 820. The one or more processors can be configured to apply power scaling to the first PUCCH and the second PUCCH to enable the first PUCCH and the second PUCCH to be transmitted from the UE in an overlapping time period if a total transmit power of the UE would exceed a specific value during a period of time, wherein a transmit power for the first PUCCH and a transmit power for the second PUCCH are scaled equally when the priority level for the first PUCCH is the same as the priority level for the second PUCCH, as in block 830.

In one example, the one or more processors can be further configured to transmit the first PUCCH to a primary cell (PCell) of a Master Cell Group (MCG). In another example, the one or more processors can be further configured to transmit the second PUCCH to a special secondary cell (SCell) of a Secondary Cell Group (SCG). In yet another example, at least one of the first UCI or the second UCI includes a hybrid automatic repeat request-acknowledgement (HARQ-ACK) or a scheduling request (SR). In one configuration, least one of the first UCI or the second UCI includes channel state information (CSI). In another configuration, the specific value is configured as a maximum transmit power ($P_{CMAX}$) such that the total transmit power for the first PUCCH and the second PUCCH shall not exceed the specific value on an overlapping time period.

Figure 9:
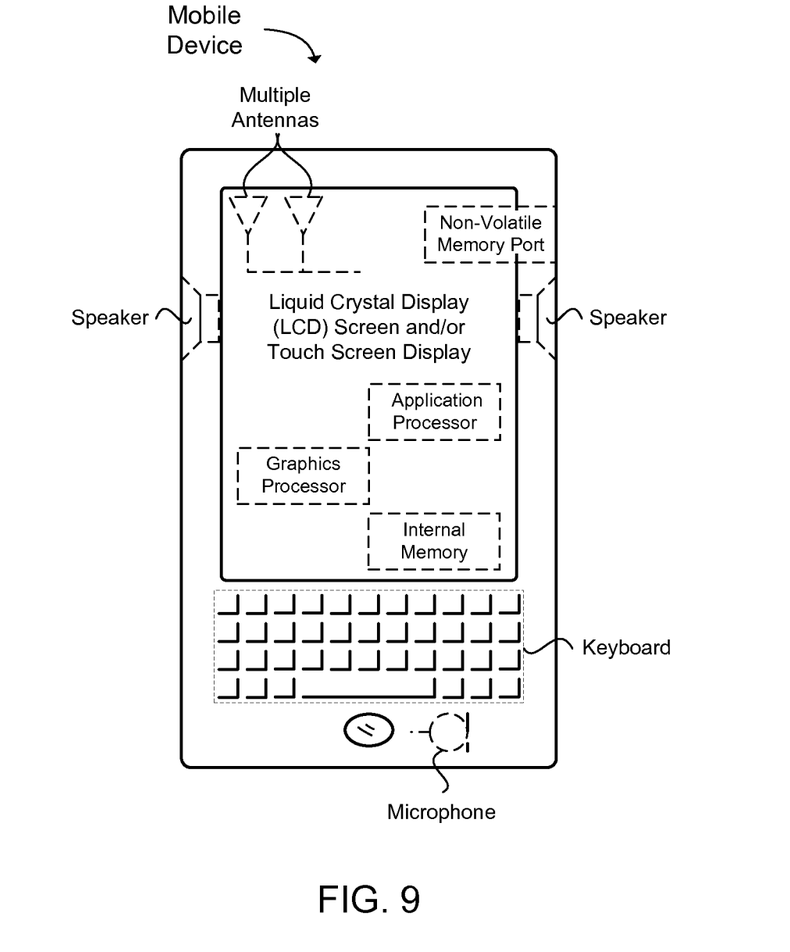
FIG. 9 illustrates a diagram of a wireless device (e.g., UE) in accordance with an example.

FIG. 9 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 9 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a user equipment (UE) configured for dual connectivity, the apparatus configured to:
process, using one or more processors and memory, a first physical channel transmission that includes a first uplink control information (UCI);
process, using the one or more processors and memory, a second physical channel transmission that includes a second UCI; and
apply, using the one or more processors and memory, power scaling to the first physical channel transmission or the second physical channel transmission when a total transmit power of the first physical channel transmission and the second physical channel transmission from the UE exceeds a maximum transmit power (PCMAX) during a period of time, wherein:
the UE is configured to scale a transmit power for the first physical channel transmission when the first UCI does not include a hybrid automatic repeat request acknowledgement (HARQ-ACK) or scheduling request (SR) and the second UCI includes a HARQ-ACK or SR; or
the UE is configured to scale a transmit power for the second physical channel transmission when the first UCI includes a hybrid automatic repeat request acknowledgement (HARQ-ACK) or scheduling request (SR) and the second UCI does not include a HARQ-ACK or SR.

2. The apparatus of claim 1, further configured to perform the first physical channel transmission in an uplink using a first physical channel for a serving cell belonging to a Master Cell Group (MCG).

3. The apparatus of claim 1, further configured to perform the second physical channel transmission in an uplink using a second physical channel for a serving cell belonging to a Secondary Cell Group (SCG).

4. The apparatus of claim 1, wherein the UE is configured to:
scale a transmit power for the first physical channel transmission when
the first UCI and the second UCI both include a hybrid automatic repeat request-acknowledgement (HARQ-ACK), and the first physical channel transmission is for a Secondary Cell Group (SCG) and the second physical channel transmission is for a Master Cell Group (MCG); or
scale a transmit power for the first physical channel transmission when the first UCI and the second UCI both include a scheduling request (SR), and the first physical channel transmission is for a Secondary Cell Group (SCG) and the second physical channel transmission is for a Master Cell Group (MCG).

5. The apparatus of claim 1, wherein:
the UE is configured to scale a transmit power for the first physical channel transmission when
the first UCI includes a SR and the second UCI includes a HARQ-ACK; or
the UE is configured to scale a transmit power for the second physical channel transmission when the first UCI includes a HARQ-ACK and the second UCI includes a SR.

6. The apparatus of claim 1, wherein the total transmit power of the first physical channel transmission and the second physical channel transmission from the UE does not exceed the PCMAX on an overlapping time period.

7. The apparatus of claim 1, wherein:
the first physical channel transmission is performed on a first Physical Uplink Control Channel (PUCCH) or a first Physical Uplink Shared Channel (PUSCH); and
the second physical channel transmission is performed on a second PUCCH or a second PUSCH.

8. The apparatus of claim 1, wherein the UE includes an antenna, a touch sensitive display screen, a speaker, a microphone, a graphics processor, an application processor, an internal memory, or a non-volatile memory port.

* * * * *